US010282677B2

United States Patent
Merler et al.

(10) Patent No.: US 10,282,677 B2
(45) Date of Patent: May 7, 2019

(54) INDIVIDUAL AND USER GROUP ATTRIBUTES DISCOVERY AND COMPARISON FROM SOCIAL MEDIA VISUAL CONTENT

(71) Applicant: INTERNATIONAL BUSINESS MACHINES CORPORATION, Armonk, NY (US)

(72) Inventors: Michele Merler, New York, NY (US); Jae-Eun Park, Wappingers Falls, NY (US); John R. Smith, New York, NY (US); Rosario Uceda-Sosa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 14/933,842

(22) Filed: Nov. 5, 2015

(65) Prior Publication Data

US 2017/0132250 A1    May 11, 2017

(51) Int. Cl.
*G06N 99/00*    (2010.01)
*H04N 21/00*    (2011.01)

(52) U.S. Cl.
CPC .......... *G06N 99/005* (2013.01); *H04N 21/00* (2013.01)

(58) Field of Classification Search
USPC ........................................................ 706/12
See application file for complete search history.

(56) References Cited

U.S. PATENT DOCUMENTS

| 7,124,149 | B2 * | 10/2006 | Smith | G06F 17/30265 |
| 7,958,068 | B2 * | 6/2011 | Smith | G06K 9/6292 |
| | | | | 706/20 |
| 8,495,143 | B2 | 7/2013 | Zhou et al. | |
| 9,251,433 | B2 * | 2/2016 | Cao | G06K 9/6202 |
| 9,251,434 | B2 * | 2/2016 | Cao | G06K 9/6202 |
| 9,311,703 | B2 * | 4/2016 | Codella | G06T 7/0012 |
| 9,311,716 | B2 * | 4/2016 | Codella | G06T 7/11 |
| 9,400,939 | B2 * | 7/2016 | Lin | G06K 9/4671 |
| 9,471,851 | B1 * | 10/2016 | Cao | G06F 17/2785 |

(Continued)

OTHER PUBLICATIONS

Semantic Image Browser: Bridging Information Visualization with Automated Intelligent Image Analysis, Jing Yang, Jianping Fan, Daniel Hubball, Yuli Gao, Hangzai Luo and William Ribarsky, Matthew Ward, IEEE Symposium on Visual Analytics Science and Technology Oct. 31-Nov. 2, 2006, pp. 191-198.*

(Continued)

*Primary Examiner* — Michael B Holmes
(74) *Attorney, Agent, or Firm* — Tutunjian & Bitetto, P.C.; Rahan Uddin

(57) ABSTRACT

A method and system are provided. The method includes deriving a set of user attributes from an aggregate analysis of images and videos of a user. The deriving step includes recognizing, by a set of visual classifiers, semantic concepts in the images and videos of the user to generate visual classifier scores. The deriving step further includes deriving, by a statistical aggregator, the set of user attributes. The set of user attributes are derived by mapping the visual classifier scores to a taxonomy of semantic categories to be recognized in visual content. The deriving step also includes displaying, by an interactive user interface having a display, attribute profiles for the attributes and comparisons of the attribute profiles.

20 Claims, 6 Drawing Sheets

(56) References Cited

U.S. PATENT DOCUMENTS

| | | | |
|---|---|---|---|
| 9,552,442 B2* | 1/2017 | Hill | G06F 17/30964 |
| 9,569,874 B2* | 2/2017 | Lin | G06K 9/4638 |
| 9,684,852 B2* | 6/2017 | Cao | G06F 17/2785 |
| 9,710,760 B2* | 7/2017 | Hill | G06F 17/30265 |
| 9,760,945 B2* | 9/2017 | Duponchel | G06Q 30/0269 |
| 9,928,448 B1* | 3/2018 | Merler | H05K 999/99 |
| 10,032,113 B2* | 7/2018 | Codella | G06F 17/30 |
| 10,049,459 B2* | 8/2018 | Codella | G06T 7/11 |
| 10,102,454 B2* | 10/2018 | Merler | H05K 999/99 |
| 2003/0028469 A1* | 2/2003 | Bergman | G06Q 30/06 705/37 |
| 2004/0117367 A1* | 6/2004 | Smith | G06F 17/30265 |
| 2009/0157571 A1* | 6/2009 | Smith | G06K 9/6256 706/12 |
| 2014/0161360 A1* | 6/2014 | Cao | G06K 9/6202 382/218 |
| 2014/0161362 A1* | 6/2014 | Cao | G06K 9/6202 382/224 |
| 2014/0279722 A1 | 9/2014 | Singh et al. | |
| 2014/0372358 A1 | 12/2014 | Zhou et al. | |
| 2016/0379086 A1* | 12/2016 | Cao | G06F 17/2785 382/116 |
| 2017/0132250 A1* | 5/2017 | Merler | G06N 99/005 |

OTHER PUBLICATIONS

Attribute-augmented Semantic Hierarchy, Towards Bridging Semantic Gap and Intention Gap in Image Retrieval, Hanwang Zhang, Zheng-Jun Zha, Yang Yang, Shuicheng Yan, Yue Gao, Tat-Seng Chua, School of Computing, National University of Singapore, MM'13, Oct. 21-25, 2013, ACM 978-1-4503-2404-5/13/10.*

Large-Scale Multimodal Semantic Concept Detection for Consumer Video, Shih-Fu Chang, Dan Ellis, Wei Jiang, Keansub Lee, Akira Yanagawa, Alexander C. Loui, Jiebo Luo, Columbia University, New York, NY & Eastman Kodak Company, MIR'07, Sep. 28-29, 2007, ACM 978-1-59593-778-0/07/0009, pp. 255-264.*

Image Classification Using Multimedia Knowledge Networks, Ana B. Benitez and Shih-Fu Chang Dept. Of Electrical Engineering, Columbia University, New York, NY, 0-7803-7750-08/03/2003 IEEE.*

IEEE Xplore Digital Library Gait analysis for recognition and classification, L. Lee, & W.E.L. Grimson Proceedings of Fifth IEEE International Conference on Automatic Face Gesture Recognition Date of Conference: May 21-21, 2002 pp. 1-8 IEEE.*

IEEE Transactions on Broadcasting, vol. 57, No. 2, Jun. 2011 165 Objective Video Quality Assessment Methods: A Classification, Review, and Performance Comparison Shyamprasad Chikkerur, Vijay Sundaram, Member, IEEE, Martin Reisslein, and Lina J. Karam pp. 165-182.*

IEEE Multimodal feature fusion for robust event detection in web videos: 2012 IEEE Conference on Computer Vision and Pattern Recognition Pradeep Natarajan, Shuang Wu, Shiv Vitaladevuni, Xiaodan Zhuang, Stavros Tsakalidis, Unsang Park, Rohit Prasad and Premkumar Natarajan pp. 1298-1305.*

IEEE Xplore Digital Library Semantic Model Vectors for Complex Video Event Recognition Michele Merler, Bert Huang, Lexing Xie, Gang Hua, Apostol Natsev IEEE Transactions on Multimedia ( vol. 14 , Issue: 1 , Feb. 2012) pp. 88-101.*

Borth et al., "Large-scale Visual Sentiment Ontology and Detectors Using Adjective Noun Pairs", ACM International Conference on Multimedia, Oct. 2013,10 pages.

Murillo, et al., "Urban Tribes: Analyzing Group Photos from a Social Perspective", IEEE Computer Society Conference: Computer Vision and Pattern Recognition Workshops (CVPRW), Jun. 2012, pp. 28-35.

Pennacchiotti, et al., "A Machine Learning Approach to Twitter User Classification", Proceedings of the Fifth International AAAI Conference on Weblogs and Social Media, Jul. 2011, 8 pages.

You et al., A Picture Tells a ThousandWords—About You! User Interest Profiling from User Generated Visual Content, arxiv.org, Apr. 2015, 7 pages.

Robertson, Adi, Facebook Users Have Uploaded a Quarter-million Photos Since the Sites Launch, Sep. 2013, 2 pages.

Facebook, "Company Information", Company Newsroom, pp. 1-6. http://newsroom.fb.com/company-info/.

Niche Ink, "Best and Worst Media Habits of the Class of 2014", Jun. 2014, pp. 1-4. https://ink.niche.com/best-worst-media-habits-class-2014/.

Youtube, "Statistics", 1 Page, https://www.youtube.com/yt/press/statistics.html.

Curalate, "Pintrist, Instagram + Tumblr Marketing & Analytics Tools", pp. 1-5, http://www.curalate.com/.

* cited by examiner

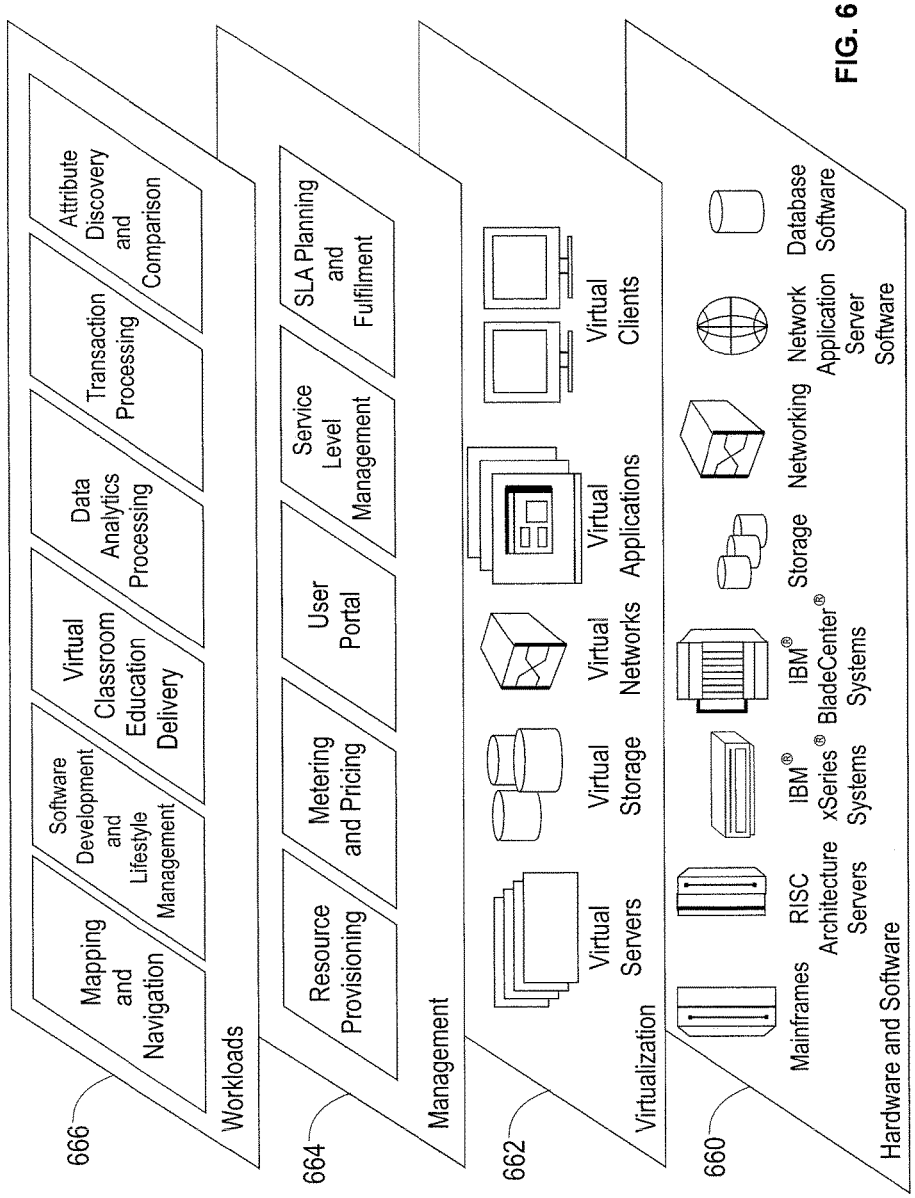

INDIVIDUAL AND USER GROUP ATTRIBUTES DISCOVERY AND COMPARISON FROM SOCIAL MEDIA VISUAL CONTENT

BACKGROUND

Technical Field

The present invention relates generally to information processing and, in particular, to individual and user group attributes discovery and comparison from social media visual content.

Description of the Related Art

There is a need to obtain rich and composite consumer attributes from social media. Such social media are becoming increasingly visual with a deluge of content shared by users every day, yet social media listening/analytics are still neglecting shared images and videos.

Traditional social listening tools to derive user attributes are based on the following: (1) text analytics, both in content and stylistic choices (for example to derive psycholinguistic traits); and (2) social connections (friends, followers, following).

Visual Analytics applied to social media content has been limited to the following: (1) sentiment analysis in pictures; (2) group affiliation recognition based on pictures analysis; (3) duplicate detection for image tracking; and (4) general event discovery.

A need remains for a system that derives user attributes from semantic analysis of visual content shared on social media.

SUMMARY

According to an aspect of the present principles, a method is provided. The method includes deriving a set of user attributes from an aggregate analysis of images and videos of a user. The deriving step includes recognizing, by a set of visual classifiers, semantic concepts in the images and videos of the user to generate visual classifier scores. The deriving step further includes deriving, by a statistical aggregator, the set of user attributes. The set of user attributes are derived by mapping the visual classifier scores to a taxonomy of semantic categories to be recognized in visual content. The deriving step also includes displaying, by an interactive user interface having a display, attribute profiles for the attributes and comparisons of the attribute profiles.

According to another aspect of the present principles, a system is provided. The system includes an aggregate analyzer for deriving a set of user attributes from an aggregate analysis of images and videos of a user. The aggregate analyzer includes a set of visual classifiers for recognizing semantic concepts in the images and videos of the user to generate visual classifier scores. The aggregate analyzer further includes a statistical aggregator for deriving the set of user attributes. The set of user attributes are derived by mapping the visual classifier scores to a taxonomy of semantic categories to be recognized in visual content. The aggregate analyzer also includes an interactive user interface having a display for displaying attribute profiles for the attributes and comparisons of the attribute profiles.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 6 shows exemplary abstraction model layers, in accordance with an embodiment of the present principles.

DETAILED DESCRIPTION OF PREFERRED EMBODIMENTS

The present principles are directed to individual and user group attributes discovery and comparison from social media visual content.

In an embodiment, the present principles provide a method and system for deriving user attributes from social media feeds by analyzing the distribution of semantic concepts automatically recognized from the posted visual content (images and videos).

In an embodiment, the present principles are performed for a set of images and videos of a user (or a group of users) and involve the following actions: (1) applying a set of pre-trained visual classifiers, which can recognize semantic concepts in images and videos with a confidence score; (2) performing a statistical aggregation over all the visual classifiers scores, mapping them into a pre-defined taxonomy of categories; (3) performing a differential analysis by comparing the semantic score distributions of different users; and (4) providing an interactive interface to visualize attributes profiles and comparisons.

In an embodiment, the present principles generate a set of user attributes derived from an aggregate analysis of semantic scores from images and videos of the user. The aggregate analysis includes: (i) a taxonomy of semantic categories to be recognized in images and videos; (ii) a set of visual classifiers that can recognize semantic concepts in images and videos; (iii) a statistical aggregator that derives user attributes by mapping the visual classifiers scores to the taxonomy categories; and (iv) a differential analyzer to compare attribute profiles.

Figure 1:
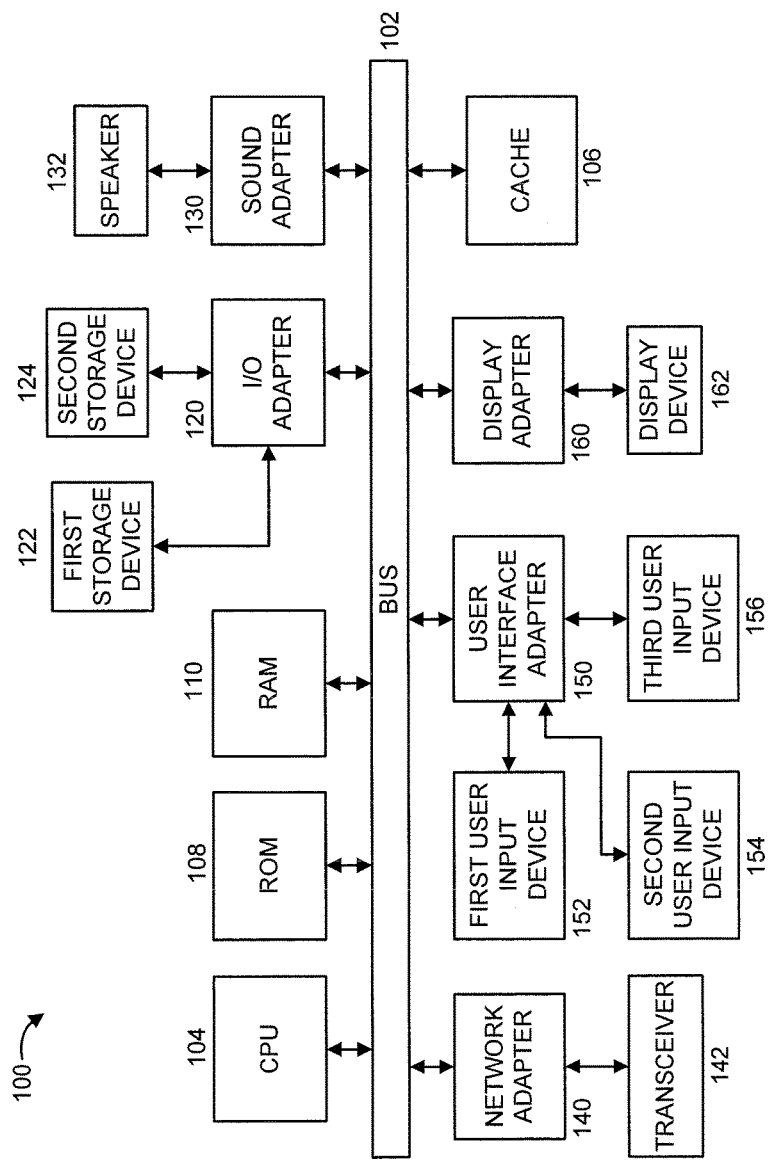
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
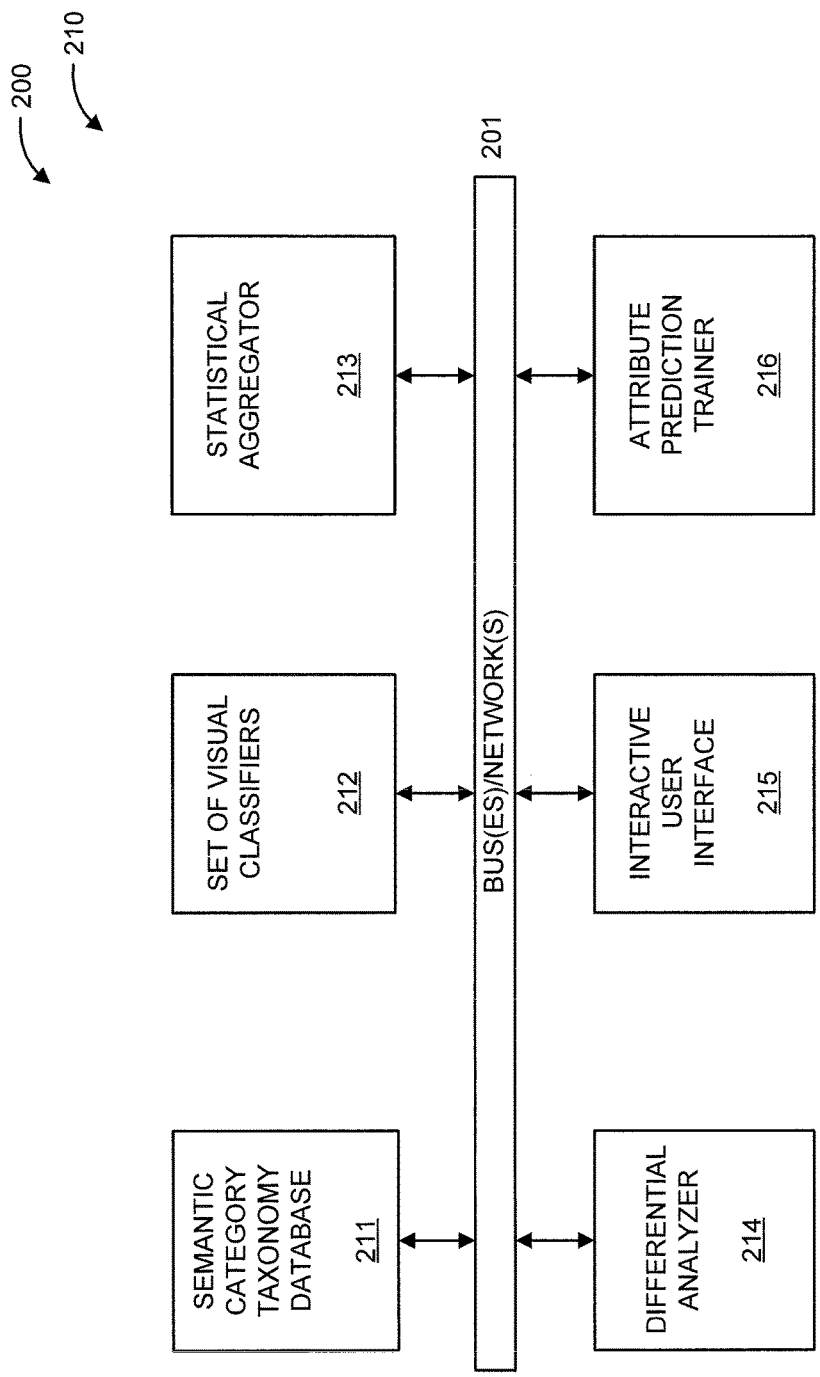
FIG. 2 shows an exemplary system 200 for individual and user group attribute discovery and comparison from social media visual content, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
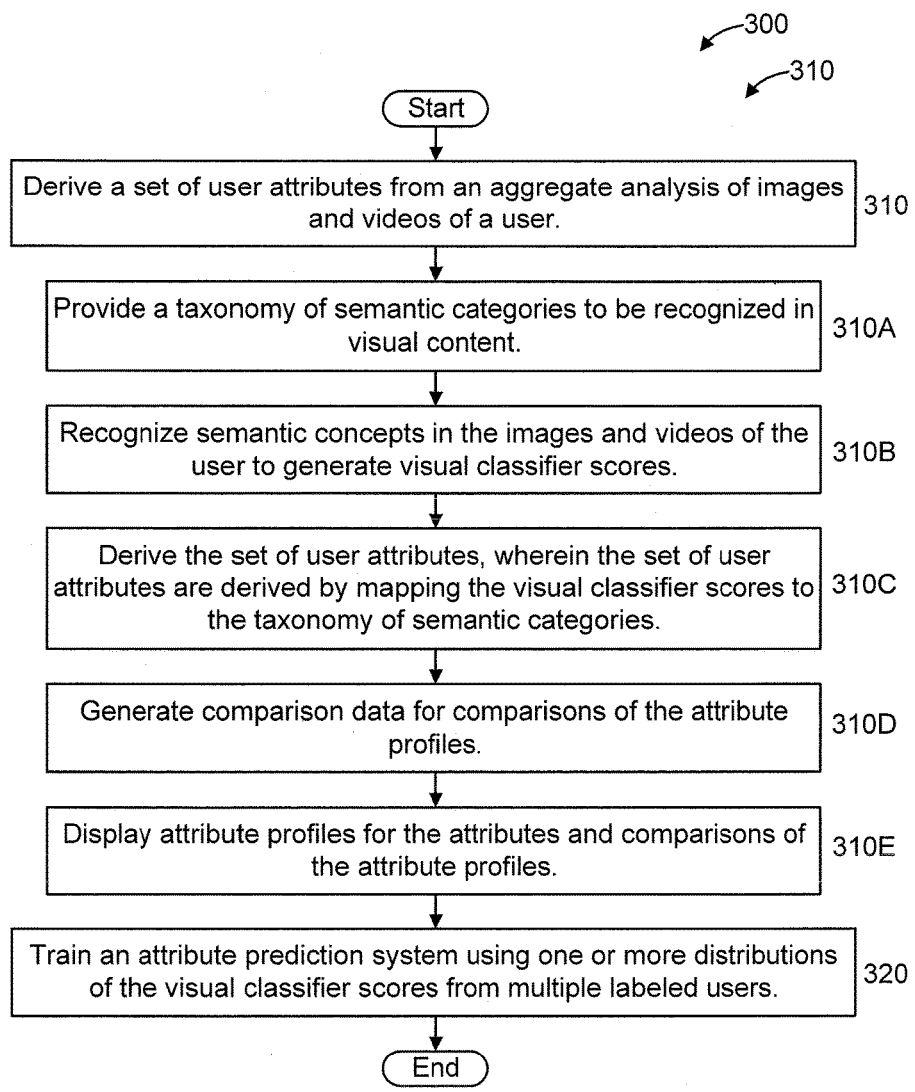
FIG. 3 shows an exemplary method 300 for individual and user group attribute discovery and comparison from social media visual content, in accordance with an embodiment of the present principles.
Figure 4:
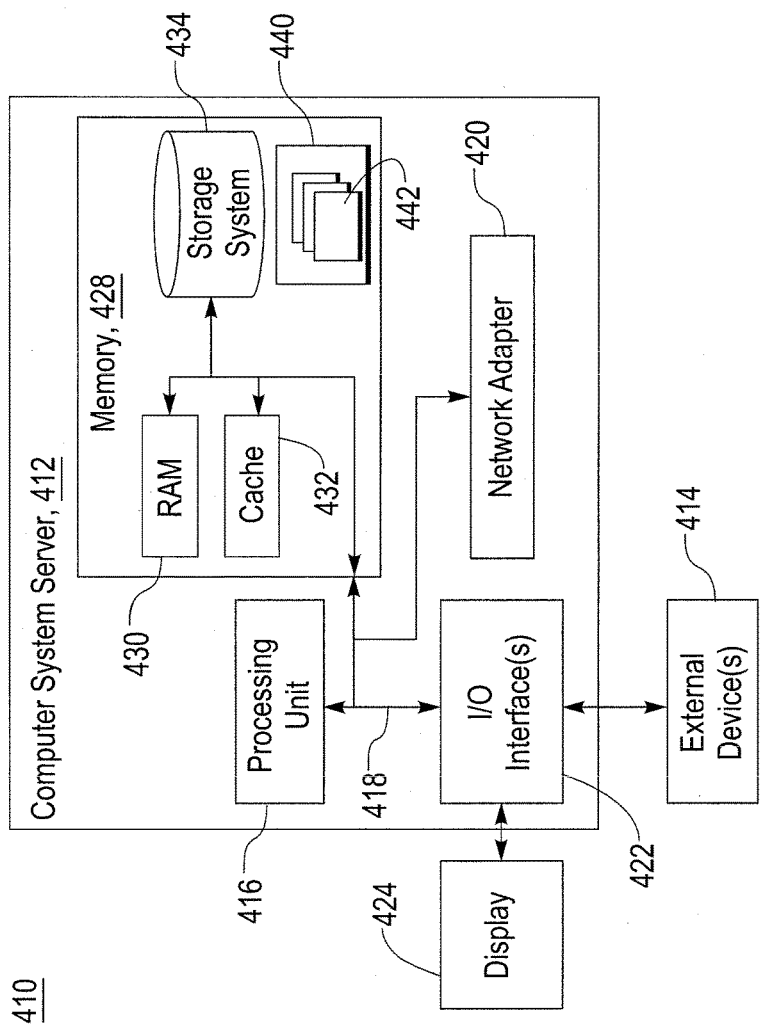
FIG. 4 shows an exemplary cloud computing node 410, in accordance with an embodiment of the present principles.

Further, it is to be appreciated that processing system 100 may perform at least part of the method described herein including, for example, at least part of method 300 of FIG. 3 4. Similarly, part or all of system 200 may be used to perform at least part of method 300 of FIG. 3.

FIG. 2 shows an exemplary system 200 for individual and user group attribute discovery and comparison from social media visual content, in accordance with an embodiment of the present principles.

The system 200 includes an aggregate analyzer 210. The aggregate analyzer 210 includes a semantic category taxonomy database 211, a set of visual classifiers 212, a statistical aggregator 213, a differential analyzer 214, an interactive user interface 215, and an attribute prediction trainer 216

The aggregate analyzer 210 derives a set of user attributes from an aggregate analysis of images and videos of a user. The images and videos can be accessed via, for example, any of a users' social media stream, a phone, a tablet, computer galleries, and so forth. The aggregate analysis can be performed over the images and videos from any of a single user and a group of users. The aggregate analysis can be performed over any of images and videos taken at different times and/or different locations.

The semantic category taxonomy database 211 stores and/or otherwise provides a taxonomy of semantic categories to be recognized in visual content. In an embodiment, the taxonomy of semantic categories is configured to model diverse topics. Such diverse topics can include, for example, but are not limited to, visual (nature, sky, urban, gym, etc.), events (sports, entertainment, etc.), living entities (people, animals), type (animation, black-and-white, color, etc.), and so forth. It is to be appreciated that the preceding topics are merely illustrative and, thus, other topics can also be used in accordance with the teachings of the present principles, while maintaining the spirit of the present principles. However, application/object-of-interest specific taxonomies can also be used in accordance with the teachings of the present principles, while maintaining the spirit of the present principles. It is to be appreciated that the taxonomy mapping as described herein provides a connection between the set of visual classifiers 212 and the user attributes.

The set of visual classifiers 212 recognize semantic concepts in the images and videos of the user to generate visual classifier scores. In an embodiment, the set of visual classifiers are pre-trained on an image dataset of visual classes, independently from any set of user attributes. In an embodiment, the set of visual classifiers can be learned from labeled data, wherein labels for the labeled data are provided by at least one of annotation, tagging, crowd-sourcing, and so forth. The set of visual classifiers 212 enable the recognition stage of the present principles to be purely machine-based without human interaction. The tagging/labelling process is also purely machine-based without human interaction.

Each of the visual classifiers 212 is automatically trained from a set of positive and negative examples of images for a given category, using a machine learning technique on top of a visual representation. The visual representation is automatically extracted from each image based on statistics of different types of information contained in each image, which could pertain to color, texture, frequency, edges, learned deep convolutional descriptors, etc. This process produces a representation for each image called feature space. Each of the visual classifiers 212 can be trained using any classification machine learning algorithm that automatically learns how to separate the set of positive exampled from the set of negative examples in feature space, and computes an optimal margin between the two sets. Classification machine learning algorithms which can be employed for this task could be, but are not limited to, any of Support Vector Machines (SVMs), Convolutional Neural Networks (CNNs), Boosting, Random Forests, and so forth. Given a new image, each of the visual classifiers 212 produces a score which is proportional to the distance of the given image to the learned margin in feature space. Such score could or could not be normalized in a specific range to make it comparable to that of other visual classifiers.

The statistical aggregator 213 derives the set of user attributes. In an embodiment, the set of user attributes are derived by mapping the visual classifier scores to the taxonomy of semantic categories. For each node in the taxonomy of semantic categories, the aggregator looks at the score from the visual classifiers whose name corresponds to any of the children of the current node. The scores from such subset of visual classifiers are then aggregated to produce one individual score for the current node. Such aggregation can be performed via various methods. For example, by computing the average over all the scores, or by selecting the minimum or maximum score, or by counting the percentage of scores which surpasses a given threshold. Any statistical method which groups a set of scores (selected according to the visual classifiers names falling in a particular subtree of the taxonomy) into a single score could be applied in this context. The result of the statistical aggregator is therefore a vector of scores, where each score represents the aggregation result for one node in the taxonomy of semantic categories.

The differential analyzer 214 generates comparison data for comparisons of the attribute profiles. The differential analyzer can use one or more distribution comparison metrics to provide the comparisons of the attribute profiles. Such distribution comparison metrics include, but are not limited to, Kolgomonorov-Smirnoff test, mean and standard deviation, and so forth. Distributions of the visual classifier scores between any of single users and groups of users can be compared by the differential analyzer 214 to provide the comparisons of the attribute profiles. Thus, any of scores between individual users, scores between individual users and groups, and scores between groups can be compared using the differential analyzer 214. For each user (or group of users), each node in the taxonomy of semantic categories is associated to a set of scores, produced by the visual classifiers whose names are present in the taxonomy subtree of the current node. Such scores can be viewed as samples of a distribution of values. As such, each node in the taxonomy tree of a user is then represented by a distribution of scores. The differential analyzer determines the difference between two users by computing the distance between each corresponding node in the taxonomy independently. In order to compute the distance between two users for a given node in the taxonomy, the differential analyzer can employ any distribution comparison metric, since each user is represented at that node by his distribution of scores. The distribution distance computation process is performed for each node in the taxonomy of semantics and the result of the differential analyzer is therefore a vector of scores, where each score represents the differential result for one node in the taxonomy of semantic categories. Optionally, since the differential scores can be of either positive or negative sign, one can apply an absolute value operator to the differential results, in order to determine only the magnitude of the difference.

The interactive user interface 215 displays attribute profiles for the attributes and comparisons of the attribute profiles.

The attribute prediction trainer 216 trains an attribute prediction system using one or more distributions of the visual classifier scores from multiple labeled users.

In the embodiment shown in FIG. 2, the elements thereof are interconnected by a bus(es)/network(s) 201. However, in other embodiments, other types of connections can also be used. Moreover, in an embodiment, at least one of the elements of system 200 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 200 are readily determined by one of ordinary skill in the art, given the teachings of the present principles provided herein, while maintaining the spirit of the present principles.

FIG. 3 shows an exemplary method 300 for individual and user group attribute discovery and comparison from social media visual content, in accordance with an embodiment of the present principles.

At step 310, derive a set of user attributes from an aggregate analysis of images and videos of a user. Step 310 involves steps 310A-E.

At step 310A, provide a taxonomy of semantic categories to be recognized in visual content.

At step 310B, recognize semantic concepts in the images and videos of the user to generate visual classifier scores.

At step 310C, derive the set of user attributes, wherein the set of user attributes are derived by mapping the visual classifier scores to the taxonomy of semantic categories.

At step 310D, generate comparison data for comparisons of the attribute profiles. The differential analyzer can use one or more distribution comparison metrics to provide the comparisons of the attribute profiles. Distributions of the visual classifier scores between any of single users and groups of users can be compared by the differential analyzer to provide the comparisons of the attribute profiles At step 310E, display attribute profiles for the attributes and comparisons of the attribute profiles.

At step 320, train an attribute prediction system using one or more distributions of the visual classifier scores from multiple labeled users.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node 410 is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
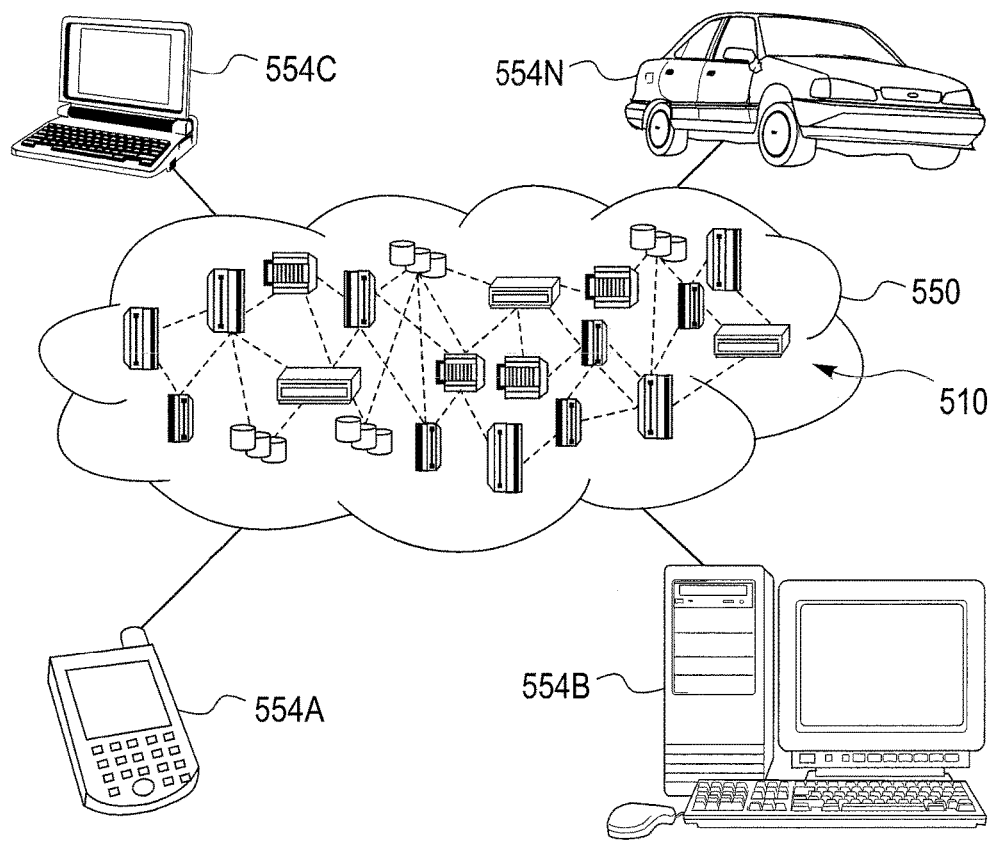
FIG. 5 shows an exemplary cloud computing environment 550, in accordance with an embodiment of the present principles.

Referring now to FIG. 5, illustrative cloud computing environment 550 is depicted. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and individual and user group attribute discovery and comparison from social media visual content.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
deriving a set of user attributes from an aggregate analysis of images and videos of a user by (i) recognizing, by a set of visual classifiers, semantic concepts in the images and videos of the user to generate visual classifier scores; and (ii) deriving, by a statistical aggregator, the set of user attributes by mapping the visual classifier scores to a taxonomy of semantic categories to be recognized in visual content; and
providing an interactive user interface, having at least one user input element and a display element, configured to interactively display attribute profiles for the attributes and comparisons of the attribute profiles.

2. The method of claim 1, wherein the comparisons of the attribute profiles are provided using a differential analyzer, the differential analyzer using one or more distribution comparison metrics to provide the comparisons of the attribute profiles.

3. The method of claim 2, wherein distributions of the visual classifier scores between any of single users and groups of users are compared by the differential analyzer to provide the comparisons of the attribute profiles.

4. The method of claim 1, further comprising training an attribute prediction system using one or more distributions of the visual classifier scores from multiple labeled users.

5. The method of claim 1, wherein the aggregate analysis is performed over the images and videos from any of, one or more single users and one or more groups of users.

6. The method of claim 1, wherein the aggregation analysis is performed over any of images and videos taken at, at least one of, different times and different locations.

7. The method of claim 1, wherein the images and videos are accessed via at least one of a users' social media stream, a phone, a tablet, and a computer gallery.

8. The method of claim 1, wherein the taxonomy of semantic categories is configured to model diverse topics.

9. The method of claim 1, wherein the set of visual classifiers are learned from labeled data, wherein labels for the labeled data are provided by at least one of annotation, tagging, and crowd-sourcing.

10. The method of claim 1, further comprising pre-training the set of visual classifiers on an image dataset of visual classes, independently from any of the user attributes.

11. A non-transitory article of manufacture tangibly embodying a computer readable program which when executed causes a computer to perform the steps of claim 1.

12. A system, comprising:
an aggregate analyzer for deriving a set of user attributes from an aggregate analysis of images and videos of a user,
wherein said aggregate analyzer includes:
a set of visual classifiers for recognizing semantic concepts in the images and videos of the user to generate visual classifier scores; and
a statistical aggregator for deriving the set of user attributes, wherein the set of user attributes are derived by mapping the visual classifier scores to a taxonomy of semantic categories to be recognized in visual content; and
an interactive user interface having at least one user input element and a display element for interactively displaying attribute profiles for the attributes and comparisons of the attribute profiles.

13. The system of claim 12, further comprising a differential analyzer for providing the comparisons of the attribute profiles, the differential analyzer using one or more distribution comparison metrics to provide the comparisons of the attribute profiles.

14. The system of claim 13, wherein distributions of the visual classifier scores between any of single users and groups of users are compared by the differential analyzer to provide the comparisons of the attribute profiles.

15. The system of claim 12, wherein the aggregate analysis is performed over the images and videos from any of, one or more single users and one or more groups of users.

16. The system of claim 12, wherein the aggregation analysis is performed over any of images and videos taken at, at least one of, different times and different locations.

17. The system of claim 12, wherein the images and videos are accessed via at least one of a users' social media stream, a phone, a tablet, and a computer gallery.

18. The system of claim 12, wherein the taxonomy of semantic categories is configured to model diverse topics.

19. The system of claim 12, wherein the set of visual classifiers are learned from labeled data, wherein labels for the labeled data are provided by at least one of annotation, tagging, and crowd-sourcing.

20. The system of claim 12, wherein the set of visual classifiers are pre-trained on an image dataset of visual classes, independently from any of the user attributes.

* * * * *